Figure 1:
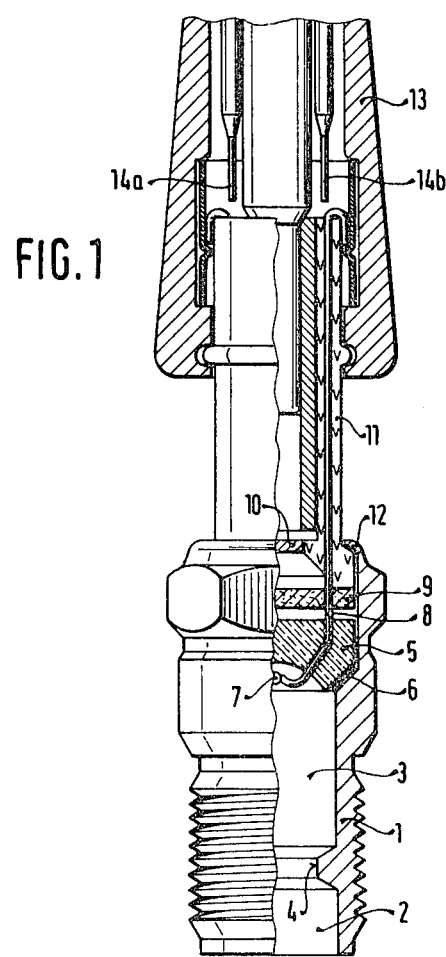

United States Patent [19]

Maurer et al.

[11] 4,358,952
[45] Nov. 16, 1982

[54] OPTICAL ENGINE KNOCK SENSOR

[75] Inventors: Helmut Maurer, Horrheim; Franz Rieger, Aalen-Wasseralfingen; Klaus Müller, Tamm; Ernst Linder, Mühlacker, all of Fed. Rep. of Germany

[73] Assignee: Robert Bosch GmbH, Stuttgart, Fed. Rep. of Germany

[21] Appl. No.: 214,513

[22] Filed: Dec. 9, 1980

[30] Foreign Application Priority Data

Mar. 26, 1982 [DE] Fed. Rep. of Germany ....... 3011570

[51] Int. Cl.³ ............................................. G01L 23/22
[52] U.S. Cl. .......................................... 73/35; 350/61

[58] Field of Search .................... 73/35, 346; 250/227, 250/554; 350/61, 96.10, 96.24; 356/44, 241, 315, 417; 313/129, 123, 124

Primary Examiner—James J. Gill
Attorney, Agent, or Firm—Frishauf, Holtz, Goodman & Woodward

[57] ABSTRACT

To detect detonations in the combustion chamber of an internal combustion engine, the sensor system is constructed as a unit that may be threadedly engaged with the combustion chamber wall, the unit including an antechamber in the region near the combustion chamber and a detector being disposed at the base of the antechamber. The sensor system further may be equipped with a heater for burning off contaminations. In a further embodiment, at least one filter disc is disposed in front of the detector, so that a selective processing of the received optical signals is possible.

11 Claims, 2 Drawing Figures

U.S. Patent

Nov. 16, 1982

4,358,952

OPTICAL ENGINE KNOCK SENSOR

The invention relates to on a sensor system to determine knocking of internal combustion engines.

BACKGROUND

The patent application Ser. No. 214,481, Dec. 9, 1980, MULLER et al., assigned to the assignee of this application, discloses a sensor system for detecting the oscillations that occur during knocking detonations in an internal combustion engine, using at least one optical sensor, preferably a glass rod or a light-conducting cable made of glass fibers.

THE INVENTION

Briefly, the sensor system uses an independent unit that can be threadedly engaged in the wall of the combustion chamber which makes possible fitting of a large measuring window therein located behind an antechamber which reduces contamination of the measuring window. An optical detector is located behind the window, either directly, or coupled thereto by a light guide. Contamination of the measuring window is further reduced by forming a constriction in the antechamber. Contamination remnants can be burned off with a heater disposed in front of the measuring window. Shaping of the measuring window as an optical lens makes possible an improvement of the light yield.

In a particularly preferred embodiment of the invention, a filter disc of predetermined selectivity is disposed between the measuring window and the optical detector so that only certain radiation bands are detected. An especially good effect is achieved if several individual filters having different selectivity are used, permitting differentiation of various radiation bands, for example, HC, CO, OH. A result which is independent of any dimming of the window can be achieved by forming the quotient of the intensity of two bands of radiation because the attenuation of the individual radiation bands cancels out when the quotient is formed.

DRAWING

Figure 2:
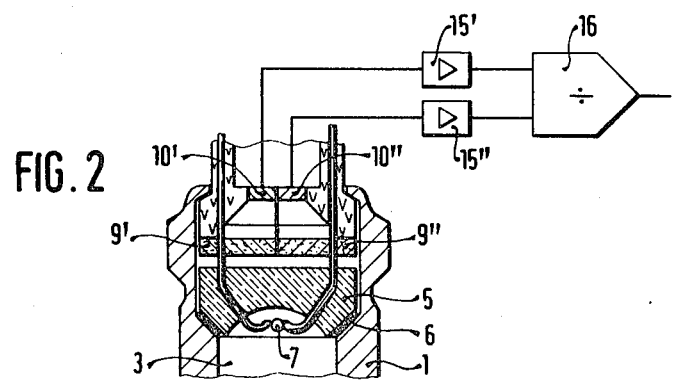

FIG. 1 is a partial, longitudinal section through a first embodiment of a sensor system according to the invention; and FIG. 2 is a section through a portion of a further embodiment of a sensor system according to the invention.

Detonations in an internal combustion engine are accompanied by a shock wave, i.e. forceful oscillations of the gas, which are correlated with light intensity fluctuations arriving at a light-sensitive detector disposed in the combustion chamber. Sensor systems of this type are described in the referenced U.S. patent application 214,481 of Dec. 9, 1980.

The sensor system according to the first embodiment, as illustrated in FIG. 1, consists of a threaded housing 1 made of metal which can be threadedly engaged in a threaded bore in the combustion chamber wall of an internal combustion engine. The threaded housing 1 has an opening 2 toward the combustion chamber; the opening 2 merges with a an antechamber 3 in the form of a cylindrical chamber which is subdivided by a reduced crossection 4 in the forward region near the opening 2. Located in the rearward region of the antechamber 3 is a window 5 which seals the antechamber from the outside in gas-tight manner with the aid of a gasket 6. The window is preferably made of glass. The sensor system according to FIG. 1 represents an independent detector which is threadedly engaged with a separate bore in the combustion chamber. This permits the realization of large windows 5 that permits transfer of a large light beam to the outside. Furthermore, the threaded coupling makes possible a rapid replacement in accordance with routine service intervals.

The antechamber 3, in conjunction with the reduced crossection 4, has the advantage that a buffer is formed between the combustion chamber and the window 5, which opposes the burning-in of particles of dirt in the window 5.

The thermal expansion of the window 5 is matched to that of the threaded housing 1. In preferred manner, it is melted into place or secured by a bead. Because contamination occurs on the side of the window facing the combustion chamber after extended operation and in spite of the presence of the antechamber 3, a heater 7 is provided which clears the window 5 by burning away deposits. Preferably the heater is embodied as a coiled wire located close to the window or as heating layer that is either printed on or vapor-deposited on the window. Heater leads 8 are passed through the window 5 and melted in place.

In order to improve the light yield and/or to concentrate the incoming light to a point at which an optical detector is located, the window 5, advantageously is shaped like a lens. Disposed behind the window 5 is a filter disc 9 which transmits only radiation within a desired wavelength range. After the light has passed through the filter disc 9, it falls on an optical detector 10 that converts the light signal into an electrical signal. Preferably, photo diodes, photo transistors or photo resistors are used for this purpose. Of course, it is also possible to guide the light passing through the filter disc 9 out of the sensor system via a light conductor, for example a light-conducting cable, to an optical detector disposed externally of the sensor system.

The system composed of the filter disc 9, the optical detector 10 or, if applicable, the light conductor and the heater leads 8 is integrated in a molded part 11, made preferably of ceramic material and held in the threaded housing 1 by a beaded flange 12. The molded part 11 receives a plug 13 with separate contacts 14a and 14b to supply heater current, as well as as a plug not shown in FIG. 1 for the contacts of the optical detector 10 or for the light conductor coupler.

In the further embodiment of the sensor system according to the invention, shown in FIG. 2, and by contrast to the embodiment shown in FIG. 1, the filter disc is divided into two separate filters 9', 9", each of the separate filters 9', 9" being coupled to interact with a respective one of two optical detectors 10', 10". The latter are then coupled to respective amplifiers 15', 15" the outputs of which are fed to a divider circuit 16.

The effect of dividing the filter disc into separate filters 9', 9" having different selectivities is that the optical detectors 10', 10" receive only predetermined bands of radiation, for example, HC, CO, or OH. The outputs of amplifiers 15', 15" are connected the divider circuit 16 to form the quotient of the intensity of two definite radiation bands. The result is a valve which is independent of any dimming of the window 5 because such dimming has the same effect on both radiation bands and cancels out when the quotient is formed in the divider circuit 16.

We claim:

1. A sensor system for detecting oscillations occurring during detonations in an internal combustion engine, having at least one optical detector positioned in the combustion chamber of the engine comprising
   a threaded housing for threaded engagement in the combustion chamber wall;
   a window (5) transparent to light closing off the housing;
   an optical detector (10) being disposed in the housing and behind said window (5) in optically coupled relation thereto; and a heater (7) located in front of the window (5) for burning off contaminating deposits forming on the window.

2. A sensor system according to claim 1, wherein the window (5) is lens-shaped.

3. A sensor system according to claim 1, further including a filter means (9) disposed between the window (5) and the optical detector (10).

4. A sensor system according to claim 3, wherein the filter means (9) comprises at least two individual filter elements (9', 9") of different spectral selectivity, each of which is exposed to light passing through the window;
   a separate optical detector (10', 10") located to receive light from the individual filter element;
   and a divider circuit (16) connected to receive the outputs from the optical detectors and forming a quotient of said outputs to obtain an output signal therefrom independent of dimming of the window.

5. A sensor system according to claim 1, wherein the optical detector (10, 10', 10") is located directly behind the window.

6. A sensor system according to claim 1, wherein the optical detector is optically coupled to the window by an intervening light conductor.

7. A sensor system according to claim 1, wherein the housing is formed, at the side facing the combustion chamber, with an antechamber (3), the window closing off the antechamber at the inside of the housing;
   and the heater (7) is located within the antechamber (3) between the narrow region and the window, for burning off contaminating deposits forming on the window.

8. A sensor system according to claim 7, wherein the antechamber (3) is formed with a narrowed region or restriction in the forward part thereof, and the heater is located between the narrow region and the window.

9. A sensor system according to claim 1 or 8, wherein the heater (7) is located closely adjacent to the window.

10. A sensor system according to claim 8, including at least one filter means (9) disposed between the window (5) and the optical detector (10).

11. A sensor system according to claim 10, wherein the filter means (9) comprises at least two individual filter elements (9', 9") of different spectral selectivity, each of which is exposed to light passing into the antechamber;
    a separate optical detector (10', 10") located to receive light from the individual filter element;
    and a divider circuit (16) connected to receive the outputs from the optical detectors and forming a quotient of said outputs to obtain an output signal therefrom independent of dimming of the window.

* * * * *

UNITED STATES PATENT AND TRADEMARK OFFICE
CERTIFICATE OF CORRECTION

PATENT NO. : 4,358,952
DATED : November 16, 1982
INVENTOR(S) : Helmut MAURER et al It is certified that error appears in the above—identified patent and that said Letters Patent is hereby corrected as shown below:

On title page:
after line 30: Mar. 26, 1982 should be -- March 26, 1980 --

Column 2, line 10, after "buffer" insert -- chamber --

Signed and Sealed this

Fifteenth Day of February 1983

[SEAL]

Attest:

GERALD J. MOSSINGHOFF

Attesting Officer

Commissioner of Patents and Trademarks